United States Patent
Henderson

(10) Patent No.: US 8,021,137 B2
(45) Date of Patent: Sep. 20, 2011

(54) WIRE COOLING WATER TROUGH

(75) Inventor: Douglas P. Henderson, Hartselle, AL (US)

(73) Assignee: Cerro Wire & Cable Co., Inc., Hartselle, AL (US)

( * ) Notice: Subject to any disclaimer, the term of this patent is extended or adjusted under 35 U.S.C. 154(b) by 772 days.

(21) Appl. No.: 12/035,852

(22) Filed: Feb. 22, 2008

(65) Prior Publication Data

US 2008/0203611 A1 Aug. 28, 2008

Related U.S. Application Data

(60) Provisional application No. 60/891,093, filed on Feb. 22, 2007.

(51) Int. Cl.
*B29C 47/88* (2006.01)
(52) U.S. Cl. ............... 425/71; 425/72.2; 425/74
(58) Field of Classification Search .......... 425/67, 425/71, 72.2, 74
See application file for complete search history.

(56) References Cited

U.S. PATENT DOCUMENTS

| | | | | | |
|---|---|---|---|---|---|
| 1,740,029 | A | * | 12/1929 | Moomy | 264/180 |
| 2,613,393 | A | * | 10/1952 | Flanagan | 425/71 |
| 5,607,700 | A | * | 3/1997 | Kando et al. | 425/71 |

* cited by examiner

*Primary Examiner* — Yogendra Gupta
*Assistant Examiner* — Joseph Leyson
(74) *Attorney, Agent, or Firm* — Jennifer E. Lacroix, Esq.; DLA Piper LLP (US)

(57) ABSTRACT

The present invention generally relates to a cooling process and system that can be utilized in the manufacture of flexible elongate extruded materials, such as tubing or jacketed electrical wire and cable. More particularly, the present invention relates to a cooling trough for cooling flexible elongate extruded materials after extrusion. Cooling trough embodiments have a base, a wet cooling chamber above the base, and an air dry chamber above the wet cooling chamber. The base contains a reservoir for collecting and storing a cooling liquid. An extruded material, such as a cable, enters the wet cooling chamber, where the cooling liquid from the reservoir is sprayed onto the material, the material is then passed to the air dry chamber where it is dried.

12 Claims, 2 Drawing Sheets

WIRE COOLING WATER TROUGH

RELATED APPLICATIONS

This application claims the benefit of U.S. Provisional Patent Application Ser. No. 60/891,093, filed Feb. 22, 2007, currently pending, the disclosure of which is hereby incorporated by reference in its entirety.

BACKGROUND

The present invention generally relates to a cooling process and system that can be utilized in the manufacture of extruded materials, including, for example, tubing, and electrical wire and cable having an extruded layer such as an insulation layer or a jacket.

In existing wire and cable manufacturing systems, insulation and/or jacket layers are often extruded onto the cable in the final stages of manufacturing. Cable exiting an extruder is very hot, and needs to be cooled prior to being packaged. Cooling troughs can be used to cool cable in such instances. Cooling troughs generally have a separate reservoir for cooling liquid that is placed in the floor or in a tank. The cooling liquid is pumped from the reservoir to the trough, where it is sprayed onto the cable. One example of a known cooling trough is the Davis-Standard Corporation Multi-Pass Capstan, MPC-18 (Part No. 501773). After being sprayed with cooling liquid, the cable is generally passed from the cooling trough to a drying unit, where air is blown onto the cable to dry it prior to packaging.

BRIEF SUMMARY

The present invention generally relates to a cooling process and system that can be utilized in the manufacture of flexible elongate extruded materials, such as tubing or jacketed electrical wire and cable. More particularly, the present invention relates to a cooling trough for cooling flexible elongate extruded materials after extrusion. In preferred embodiments, the cooling process and system provided by cooling troughs of the present invention can be utilized in the manufacture of electrical wire and cable having jackets comprised of thermoplastic, thermosetting or rubber insulate materials.

In one aspect, the present invention provides cooling troughs having a base, a wet cooling chamber above the base, and an air dry chamber above the wet cooling chamber. The base has a reservoir for a cooling liquid. The wet cooling chamber has a plurality of spray nozzles that spray the cooling liquid onto a cable, and at least two rotatable sheaves for passing the cable through the wet cooling chamber. Preferably, cooling liquid sprayed in the wet cooling chamber drains into the reservoir. The air dry chamber has a plurality of air wipes that inject air into the chamber and onto the cable. Preferably, the air dry chamber also has an air exhaust system having a baffle and a vent. It is also preferred that cooling liquid separated from the cable in the air dry chamber drains into the reservoir.

In another aspect, the present invention provides methods of cooling a cable. In such methods, a cooling trough is provided that has a base having a cooling liquid reservoir, a wet cooling chamber, and an air dry chamber. A cable can then be cooled by passing cable to a first rotatable sheave in the wet cooling chamber of the cooling trough, cooling the cable by spraying a cooling liquid from spray nozzles onto the cable as it passes from the first rotatable sheave to a second rotatable sheave in the wet cooling chamber, draining cooling liquid from the wet cooling chamber into the cooling liquid reservoir in the base, passing the cable from the wet cooling chamber to the air dry chamber, drying the cable in the air dry chamber by injecting air onto the cable to separate cooling liquid from the cable, and draining cooling liquid separated from the cable in the air dry chamber into the cooling liquid reservoir in the base.

DETAILED DESCRIPTION

Cooling troughs of the present invention can be generally utilized to cool extruded materials, such as tubing or cables having extruded layers. Cooling troughs of the present invention are preferably a single unit that incorporates several sections, including a base having a reservoir for the storage of cooling liquid, a wet cooling chamber, and an air dry chamber.

Cooling troughs of the present invention, as well as individual components and sections thereof can be made of any suitable material, and are preferably made of stainless steel. The use of stainless steel tends to avoid rust.

Figure 1:
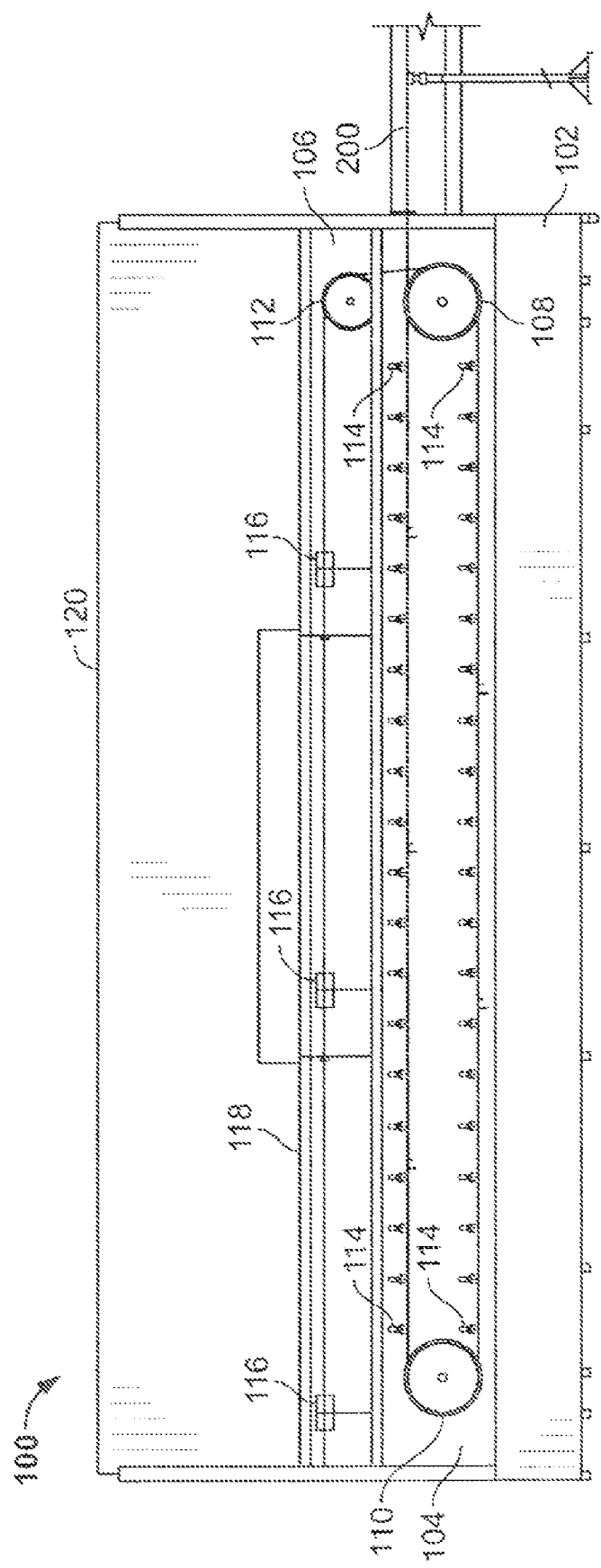
FIG. 1 is a front elevational view of one embodiment of a cooling trough, having an open vertical door.
Figure 2:
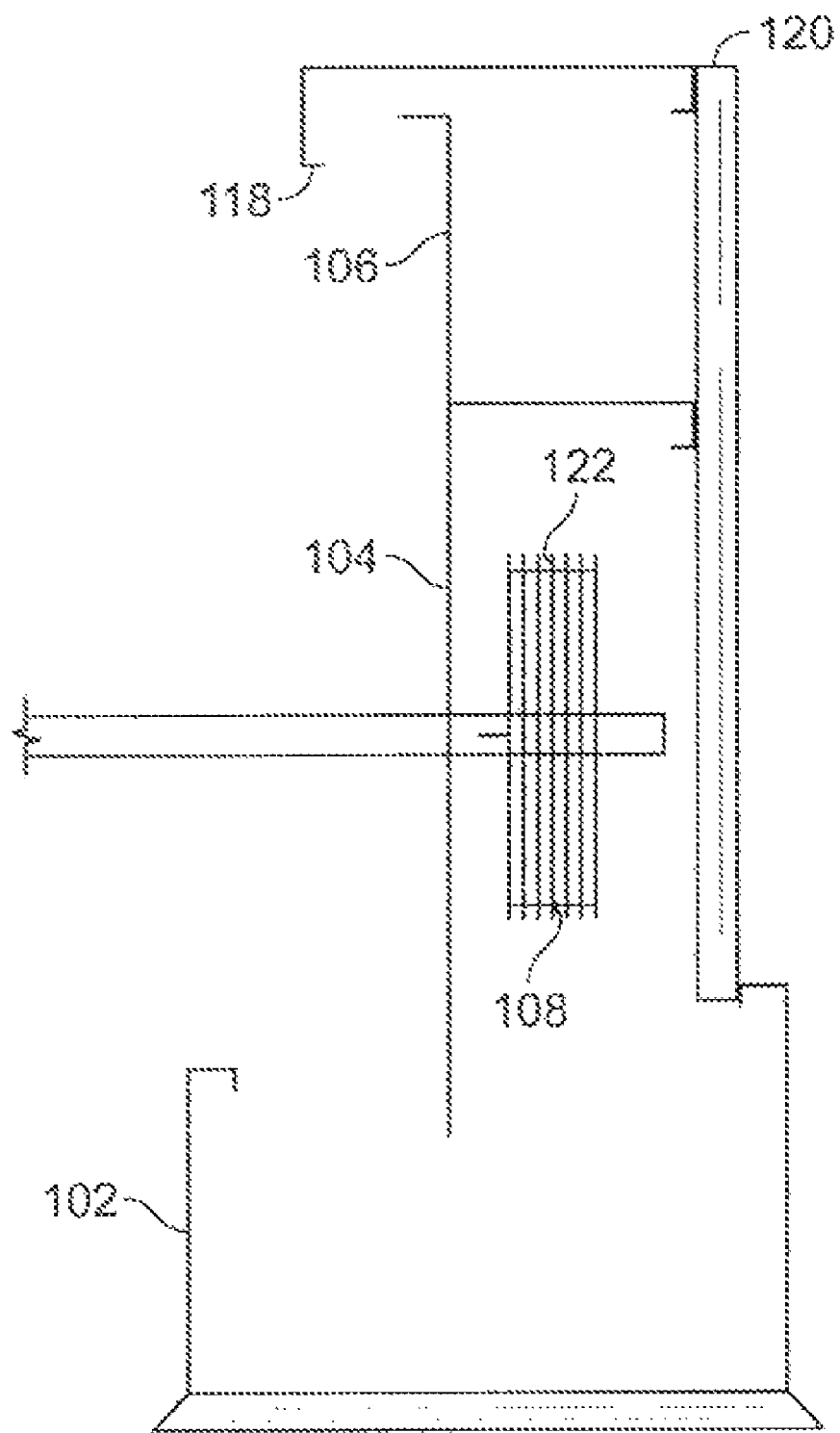
FIG. 2 is a side elevational view of the embodiment of FIG. 1.

FIGS. 1 and 2 illustrate a preferred embodiment of a cooling trough 100. Cooling trough 100 has a base 102, a wet cooling chamber 104 above the base 102, and an air dry chamber 106 above the wet cooling chamber 104. As shown in FIG. 2, the cooling trough 100 preferably has a width that is greater at the base than at the other sections thereof, including the wet cooling chamber 104 and the dry cooling chamber 106. While cooling troughs of the present invention can have any suitable dimensions, they are preferably units that are relatively long and thin. For example, particularly preferred embodiments of cooling troughs of the present invention can have a length that is up to about thirty (30) feet, or up to about twenty-five (25) feet. Such embodiments can have a width that is up to about thirty (30) inches wide. Further, such embodiments can have a height that is up to about six (6) feet.

The base 102 is preferably at the bottom of the cooling trough, and contains a reservoir for storing a cooling liquid. The base 102 is designed to be the widest part of the structure in order to facilitate recovery of the cooling liquid utilized in the higher sections of the cooling trough. The wet cooling chamber 104 has a plurality of spray nozzles that spray the cooling liquid onto a cable 200 as it is passed through the wet cooling chamber 104. The wet cooling chamber 104 also has at least two rotatable sheaves 108 and 110 for passing the cable 200 through the wet cooling chamber. The air dry chamber 106 has a plurality of air wipes 116 that inject air into the chamber and onto the cable 200. Preferably, the air dry chamber 106 also has an air exhaust system 118. The air exhaust system preferably has at least one baffle, and at least one vent.

In practice, cooling trough 100 can be provided as part of a manufacturing process for extruded materials. For example, cooling troughs of the present invention can be utilized in wire and cable manufacturing systems for wires and cables of various types and sizes, including, but not limited to, sizes ranging from 18 AWG to 8 AWG single conductors, and multi-conductor cables up to 4×10 AWG. In such systems, an insulation layer or a jacket is often extruded onto a cable 200. As the cable 200 leaves the extruder, the temperature of at least the extruded insulation layer or jacket tends to be from about 200° F. to about 300° F. The cable 200 can be passed from the extruder to a cooling trough 100 to be cooled to a temperature that is acceptable for packaging the cable, preferably below about 130° F., and more preferably from about 90° F. to about 130° F. The degree of cooling achieved by this cooling trough design can be affected by several factors, including, for example, the temperature of the cooling water and the dwell time, which is the length of time that the cable is exposed to the cooling water. Dwell time can be increased, for example, by either increasing the length of the cooling trough, increasing the number of sheaves utilized in the wet cooling chamber, or increasing the number of grooves on each sheave to increase the number of passes that the cable makes through the wet cooling chamber.

As illustrated in FIG. 1, cable 200 can be cooled by passing the cable 200 from the extruder to the first rotatable sheave 108 in the wet cooling chamber 104 of the cooling trough 100, and cooling the cable 200 by spraying a cooling liquid from the spray nozzles 114 onto the cable 200 as it passes from the first rotatable sheave 108 to a second rotatable sheave 110 in the wet cooling chamber 104. Preferably, the first rotatable sheave 108 and the second rotatable sheave 110 have multiple grooves 122 thereon, in which the cable 200 travels such that it makes multiple passes through the cooling chamber 104 between the first sheave 108 and the second sheave 110.

A plurality of spray nozzles 114 are preferably mounted in the wet cooling chamber 104 along the path of the cable as it passes from the first sheave 108 to the second sheave 110, and as the cable 200 passes back from the second sheave 110 to the first sheave 108. Preferably, there are enough spray nozzles 114 within the wet cooling chamber 104 to cool the cable 200 to a temperature of about 105° F. or less. In some embodiments, a spray nozzle 114 is located every twelve (12) inches along the path of the cable 200 within the wet cooling chamber 104.

The cooling liquid that is collected and stored in the reservoir is preferably pumped from the reservoir to the spray nozzles 114, where it is sprayed onto the cable 200. After being sprayed onto the cable 200, a majority of the cooling liquid falls to the bottom of the wet cooling chamber 104, and preferably drains from the wet cooling chamber 104 into the cooling liquid reservoir in the base 102. The wet cooling chamber 104 can be open directly to the reservoir in the base 102, or can have a floor with a drainage system that passes the cooling liquid to the reservoir.

The pumping system that provides the cooling liquid from the reservoir in the base 102 to the spray nozzles 114 is preferably a closed loop system. The cooling liquid preferably passes through at least one filter and at least one chiller as it is pumped from the reservoir to the spray nozzles. The cooling liquid is preferably water, and can be standard process water such as is normally utilized in cooling systems for wire and cable. Process water can be treated, such as, for example, by anti-bacterial or anti-scaling treatments. It is preferable that the cooling water be treated to prevent forming of algae and bacteria that would be harmful to operators and to the cleanliness of the cooling trough.

As illustrated in FIG. 1, after passing through the wet cooling chamber 104, the cable 200 is passed from the wet cooling chamber 104 to the air dry chamber 106 by passing from the first sheave 108 to a third sheave 112 located in the air dry chamber 106 above the wet cooling chamber 104. The air dry chamber 106 is preferably located at the top of the cooling trough unit. The air dry chamber 106 has a plurality of air wipes 116 mounted therein that inject air into the air dry chamber 106 and onto the cable 200. The cable 200 is thus dried in the air dry chamber 106 by injecting air from the air wipes 116 onto the cable 200 to separate any residual cooling liquid from the cable 200. Air wipes 116 are designed to absorb the volume of air injected into the system and vent it through the exhaust system 118.

Air exhaust system 118 exhausts air injected by the air wipes 116 of the air dry chamber 106. The air exhaust system 118 preferably has at least one vent through which the air can pass, and at least one baffle. Because some of the cooling liquid may undergo a phase change and become vapor during the cooling process, the baffle can facilitate the condensation and collection of the cooling liquid. The baffle can also act as a noise buffer or muffler with respect to the noise generated by the air wipes 116.

The air dry chamber 106 is preferably designed such that cooling liquid that becomes vapor, as well as residual cooling liquid that is separated from the cable 200 in the air dry chamber 106, is preferably drained into the cooling liquid reservoir in the base 102. The air dry chamber 106 can be open directly to the wet cooling chamber 104 and the reservoir in the base 102, so that droplets of cooling liquid can fall directly into the reservoir. Alternatively, air dry chamber 106 can have a drainage system that collects droplets of cooling liquid and passes the collected cooling liquid to the reservoir.

When the wire leaves the air dry chamber 106 chamber, and passes from the cooling trough 100, it is preferably cool, dry and ready for packaging. In some embodiments, the dry cable 200 can be passed directly from the cooling trough 100 to a packaging unit. In such embodiments, the dry cable preferably has a temperature of about 105° F. or less.

Cooling troughs of the present invention are preferably enclosed units, having walls and a door that can be opened to view and access the various components and sections. In at least some embodiments, cooling troughs have at least three walls and a door that enclose the base, the wet cooling chamber, and the air dry chamber. More preferably, the base 102 containing the reservoir is enclosed on all sides and on the bottom, although the top can be open to the other sections of the cooling trough. As illustrated in FIGS. 1 and 2, cooling trough 100 has a door 120 that opens and closes in the vertical plane. Door 120 can be any suitable door or lid. Preferably, however, door 120 can be operated by a mechanism similar to a commercial overhead door opener. This type of door can allow unrestricted operator access and prevents water from dripping on the floor when the door 120 is opened.

Cooling troughs of the present invention can provide many benefits and advantages over current cooling systems. For example, embodiments of cooling troughs of the present invention can improve manufacturing cleanliness, safety and efficiency by containing cooling liquid and cooling liquid vapor, thus preventing spillage onto the manufacturing floor. Further, various embodiments can provide improved air drying with lower noise levels.

EXAMPLE

Cooling Trough Start-Up Procedure

A cooling trough of the present invention can be added to a cable or wire manufacturing process in any suitable manner. One example of a start-up procedure is set forth here:
1. The power to the motor that drives the pulleys or sheaves in the cooling trough should be shut off.
2. The air to the air wipes in the cooling trough should be shut off.
3. The water flowing to the cooling spray nozzles in the cooling trough must be shut off or diverted to flow directly to the trough reservoir.

4. The vertical door of the cooling trough is raised by pressing the "Open Door" button to activate air cylinders to provide access for stringing wire through the machine.
5. Wire is threaded through the entry opening and is pulled to the opposite end (exit end) of the cooling chamber where it is wrapped for 180° around the first sheave on the back side of the cooling chamber (starting at the top of the sheave) and is then pulled back to the entry end of the cooling chamber.
6. The wire is then wrapped around the first sheave on the back side of the cooling chamber (starting at the bottom of the sheave) for 180°.
7. The wire is then pulled back to the exit end of the cooling trough, wrapped around the second sheave from the back (starting at the top of the sheave) for 180° and then pulled back to the entry end of the cooling chamber.
8. This procedure is repeated until the wire is wrapped only 90° around the outermost sheave on the entry end of the cooling chamber (starting at the bottom) and is then directed through the opening into the air dry chamber above and 90° around a sheave and then back toward the exit end of the chamber.
9. As the wire is pulled toward the exit end of the chamber, it is threaded through three or more air wipes and on out the exit opening in the air dry chamber.
10. From here the wire is threaded through over and around guide sheaves, eyelets, printers, spark testers, etc until the wire arrives at the packaging station on the line.
11. The door to the cooling trough is lowered by pressing the "Close Door" button.
12. When the complete line is ready to run, the electricity is restored to the motor turning the sheaves on the exit end of the cooling trough, the air pressure to the air wipes is restored, and the water supply to the cooling sprays is restored.
13. The motor powering the one set of sheaves in the cooling trough is electronically coordinated so the surface speed of the powered sheaves where the wire is wrapped equals that of the wire speed at other points along the extrusion line.
14. By using supplying sufficient cool water to the cooling trough and adequate air pressure and volume through sufficiently efficient air wipes. Dry wire at a suitable temperature (approx. 120° F.) is supplied continuously to the packaging equipment.

From the foregoing, it will be appreciated that although specific embodiments of the invention have been described herein for purposes of illustration, various modifications may be made without deviating from the spirit or scope of the invention. For example, the inventive apparatus and method can be used in other operations requiring process cooling, such as with the manufacture of rope or tubing, in addition to wire and cable manufacturing. It is therefore intended that the description provided above of the structures, sequences, and uses of the preferred embodiments be regarded as illustrative rather than limiting, and that it be understood that it is the following claims, including all equivalents, that are intended to particularly point out and distinctly claim the subject matter regarded as the invention.

What is claimed is:

1. A cooling trough for wire or cable, the cooling trough comprising:
    a base including a, reservoir for a cooling liquid;
    a wet cooling chamber above the base including a plurality of spray nozzles that spray the cooling liquid onto a cable, and at least two rotatable sheaves for passing the cable through the wet cooling chamber;
    an air dry chamber above the wet cooling chamber, the air dry chamber including a plurality of air wipes that inject air into the chamber and onto the cable, and an air exhaust system having a baffle and a vent; and
    at least three walls and a door that enclose the base, the wet cooling chamber, and the air dry chamber.
2. The cooling trough of claim 1, wherein the cooling liquid is water.
3. The cooling trough of claim 1, wherein the air exhaust system exhausts air injected by the air wipes of the air dry chamber.
4. The cooling trough of claim 1, wherein cooling liquid sprayed in the wet cooling chamber drains into the reservoir.
5. The cooling trough of claim 1, wherein cooling liquid separated from the cable in the air dry chamber drains to the reservoir.
6. The cooling trough of claim 1, wherein the cooling trough has a width that is greater at the base than at the wet cooling chamber and the dry cooling chamber.
7. The cooling trough of claim 1, wherein the door opens and closes in the vertical plane.
8. A cooling trough for wire or cable, the cooling trough comprising:
    a base including a reservoir for a cooling liquid;
    a wet cooling chamber above the base, the wet cooling chamber including a plurality of spray nozzles that spray the cooling liquid onto a cable, and at least two rotatable sheaves for passing the cable through the wet cooling chamber, wherein cooling liquid sprayed in the wet cooling chamber drains into the reservoir;
    an air dry chamber including a plurality of air wipes that inject air into the chamber and onto the cable, and an air exhaust system having a baffle and a vent; wherein cooling liquid separated from the cable in the air dry chamber drains to the reservoir; and
    at least three walls and a door that enclose the base, the wet cooling chamber, and the air dry chamber.
9. The cooling trough of claim 8, wherein the cooling liquid is water.
10. The cooling trough of claim 8, wherein the air exhaust system exhausts air injected by the air wipes of the air dry chamber.
11. The cooling trough of claim 8, wherein the cooling trough has a width that is greater, at the base than at the wet cooling chamber and the dry cooling chamber.
12. The cooling trough of claim 8, wherein the door opens and closes in the vertical plane.

* * * * *